April 19, 1938. A. J. PETERSON 2,114,857
REMOTE INDICATING SYSTEM
Filed June 26, 1935
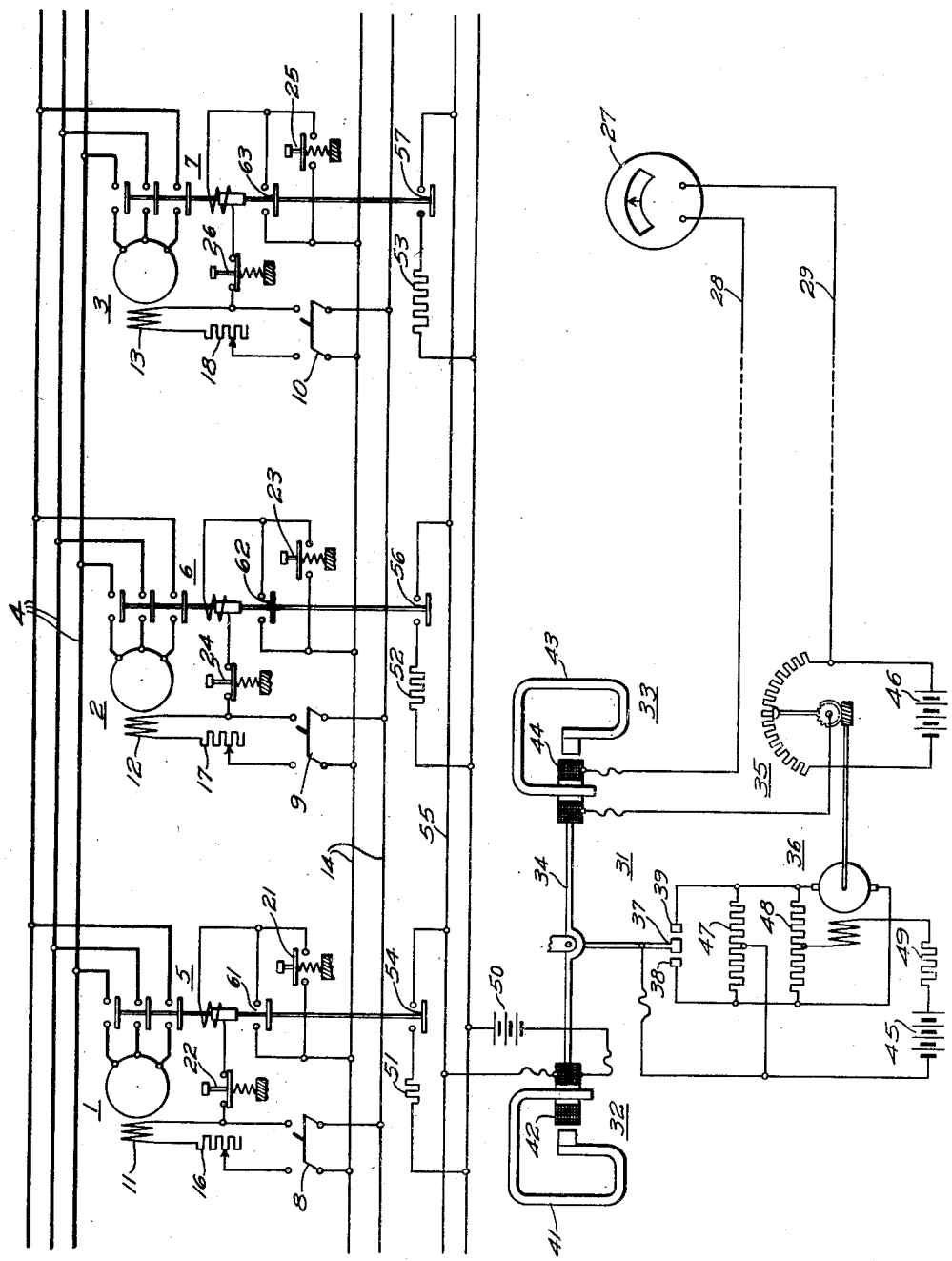
WITNESSES:
INVENTOR
Alfred J. Peterson.
BY
ATTORNEY Patented Apr. 19, 1938

2,114,857

UNITED STATES PATENT OFFICE 2,114,857

REMOTE INDICATING SYSTEM

Alfred J. Peterson, Wilkinsburg, Pa., assignor to Westinghouse Electric & Manufacturing Company, East Pittsburgh, Pa., a corporation of Pennsylvania Application June 26, 1935, Serial No. 28,585

2 Claims. (Cl. 177—311)

My invention relates, in general, to remote indicating systems and more particularly to systems for remotely indicating connected load capacities.

An object of my invention, generally stated, is to provide a remote indicating system which shall be simple and efficient in operation and which may be readily and economically installed.

A more specific object of my invention is to provide for remotely indicating or recording the total connected load capacity of a power generating station or a manufacturing plant and the like.

Other objects of my invention will be explained fully hereinafter or will be apparent to those skilled in the art.

In accordance with one embodiment of my invention, a small current, proportional to the total connected capacity in a power station is transmitted by a tele-metering system to a receiving station. The current is obtained by totalizing small currents, each of which is proportional to the capacity of one of the generating units in the station. The individual currents are supplied to the transmitting equipment through an auxiliary switch on the generator breaker, or connecting device, and a resistor which is inversely proportional to the generator capacity.

For a fuller understanding of the nature and objects of my invention, reference may be had to the following detailed description, taken in conjunction with the accompanying drawing, in which the single figure is a diagrammatic view of a remote indicating system embodying my invention.

Referring to the drawing, the system shown comprises a plurality of power units 1, 2 and 3, which may be individually connected to a power bus 4 by means of electrically-operated switches 5, 6 and 7, respectively. It will be understood that the power units may be either generators for supplying power to a power system, transformers for translating power, or motors operated by power received from a power system. Furthermore, the indicating system herein described may be utilized in connection with a manufacturing plant, in which case the numerals 1, 2 and 3 may be considered as designating manufacturing units.

Field switches 8, 9 and 10 are provided for connecting field windings 11, 12 and 13 of the machines 1, 2 and 3, respectively, to an excitation bus 14, which may be energized from any suitable source (not shown). Variable resistors 16, 17 and 18 are provided for controlling the excitation current of the respective machines. The operation of the switch 5 may be controlled by a pair of push-button switches 21 and 22 to connect the power unit 1 to the bus 4, as will be more fully described hereinafter. Similar pairs of push-button switches 23 and 24, and 25 and 26 are provided for controlling the connecting switches 6 and 7, respectively.

In order that an indication or record, or both, of the load capacity of the power units which are connected to the power bus or are in operation may be obtained, at a point remotely located from the power units, an indicating instrument 27 may be provided at any desired location. As illustrated the instrument 27 may be of the type having a visible graduated scale and pointer. The meter 27 is connected by means of conductors 28 and 29 to a transmitting device 31, which may be one of the standard types well known in the remote indicating or tele-metering art.

The particular transmitting device shown comprises a Kelvin balance, having d'Arsonval type meter elements 32 and 33 disposed at opposite ends of a pivoted beam 34; a rheostat 35; a motor 36 for operating the rheostat, and a contact arm 37, actuated by the pivoted arm 34 to engage contact members 38 and 39 to control the operation of the motor 36.

The element 32 consists of a permanent magnet 41 and a movable coil 42, carried by the pivoted arm 34. The element 33 is similar to the element 32 and consists of a permanent magnet 43 and a movable coil 44. The coils of the balance may be so connected as to be affected by current, voltage, or any other electrical quantity and to transmit an indication of the same to the indicating instrument 27.

Thus, when current is permitted to flow through the coil 42, the beam 34 is unbalanced, the motor 36 is connected to a battery 45 and the rheostat 35 operated to regulate the current flowing through the coil 44 from a battery 46 to restore the balance of the arm 34. The current flowing through the coil 44 is transmitted to the instrument 27, which may be calibrated to indicate the current supplied to the coil 42 of the Kelvin balance.

If the current in the coil 42 decreases, thereby unbalancing the arm 34, the motor 36 operates the rheostat 35 in the opposite direction to again restore the balance and the instrument 27 indicates the change in current. Resistors 47, 48 and 49 are provided for controlling the operation of the motor 36 in a well known manner.

In order that such a transmitting device may be utilized to indicate the total capacity of the power units 1, 2 and 3 which are in operation, I have devised a means for supplying the transmitting device 31 with a current which is proportional to the load capacity of the units which are connected to the power bus 4. The current supplied to the coil 42, on the Kelvin balance, from a battery 50 is controlled by resistors 51, 52 and 53, which are associated with the connecting switches 5, 6 and 7, respectively. An auxiliary contact member 54 is actuated by the switch 5 to connect the resistor 51 across a control bus 55. Likewise, auxiliary contact members 56 and 57 are provided for connecting the resistors 52 and 53, respectively, across the control bus 55, to which the battery 50 and the coil 42 are also connected.

The resistors 51, 52 and 53 are inversely proportional to the load capacities of the power units 1, 2 and 3, respectively, and the current supplied to the transmitting device 31, when a power unit is connected to the power bus, is directly proportional to the capacity of the connected unit. Therefore, the total current supplied the transmitting device is proportional to the total connected capacity of the power units and the instrument 27 indicates the total connected capacity.

For example, if unit 1 is of 5000 kw. capacity, unit 2 is 2000 kw., and unit 3 is 1000 kw., and the potential of the battery 50 is fifty volts, the resistor 51 may be ten ohms, the resistor 52 may be twenty-five ohms and the resistor 53 may be fifty ohms, thereby permitting five amperes to be supplied to the transmitting device 31 when unit 1 is connected to the power bus, two amperes when unit 2 is connected and one ampere when unit 3 is connected. In this manner the capacity of the power units which are connected to the power bus may be indicated or recorded at any desired point, which may be located remotely from the power station.

It will be noted that the connecting switches 5, 6 and 7 are each provided with an auxiliary contact member 61, 62 and 63, respectively, which function to establish holding circuits for the actuating coils of these switches. Thus, when the switch 5 is closed by closing the push-button switch 21, it will remain closed until the push-button switch 22 is opened to interrupt the holding circuit for the actuating coil of the switch. It will be understood that various other schemes, well known in the art, may be utilized to control the operation of the power units, and the remote indicating system, herein described, is not limited to any particular method of controlling the operation of the power units.

Since many modifications may be made in the apparatus and arrangement of parts without departing from the spirit of my invention, I do not wish to be limited other than by the scope of the appended claims.

I claim as my invention:

1. In a power system, in combination, a plurality of power units of different load capacities, switching means for individually connecting the power units for operation in the power system, means for controlling the operation of said switching means, an indicating instrument, current transmitting means remotely connected to the indicating instrument, resistors, each of which is inversely proportional to the load capacity of one of said power units, a source of potential for energizing said resistors, and means actuated by the switching means for each power unit for connecting the resistor corresponding to that power unit to the current transmitting means in parallel-circuit relation to the resistors for the other power units to cause a current directly proportional to the load capacities of the connected power units to be transmitted to the indicating instrument.

2. In a power system, in combination a plurality of power units of different load capacities, switching means for independently connecting the power units for operation in the power system, means for individually controlling the operation of said switching means, an indicating instrument, current transmitting means remotely connected to the indicating instrument, a source of potential for energizing said current transmitting means, current controlling means, each of which conducts current proportional to the load capacity of one of said power units, and means actuated by the switching means for each power unit for connecting the current controlling means corresponding to that power unit in the energizing circuit for the current transmitting means in parallel circuit relation to the current controlling means for the other power units, thereby causing a current directly proportional to the load capacities of the connected power units to be transmitted to the indicating instrument.

ALFRED J. PETERSON.